United States Patent
Meng et al.

(10) Patent No.: US 11,170,789 B2
(45) Date of Patent: Nov. 9, 2021

(54) ATTENTIVE ADVERSARIAL DOMAIN-INVARIANT TRAINING

(71) Applicant: Microsoft Technology Licensing, LLC, Redmond, WA (US)

(72) Inventors: Zhong Meng, Seattle, WA (US); Jinyu Li, Redmond, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 171 days.

(21) Appl. No.: 16/523,517

(22) Filed: Jul. 26, 2019

(65) Prior Publication Data
US 2020/0335108 A1   Oct. 22, 2020

Related U.S. Application Data

(60) Provisional application No. 62/834,565, filed on Apr. 16, 2019.

(51) Int. Cl.
*G10L 17/18* (2013.01)
*G10L 15/06* (2013.01)
(Continued)

(52) U.S. Cl.
CPC ............ *G10L 17/18* (2013.01); *G06N 3/0454* (2013.01); *G10L 15/02* (2013.01); *G10L 15/063* (2013.01); *G10L 15/16* (2013.01); *G10L 17/04* (2013.01)

(58) Field of Classification Search
CPC ....... G10L 17/18; G10L 17/04; G10L 15/063; G10L 15/16; G10L 15/07; G10L 2015/228; G06N 3/008
(Continued)

(56) References Cited

U.S. PATENT DOCUMENTS

| 8,209,174 B2 * | 6/2012 | Al-Telmissani | G10L 17/06 704/246 |
| 10,652,655 B1 * | 5/2020 | Weldemariam | G10L 21/0316 |

(Continued)

OTHER PUBLICATIONS

Adversarial Learning of Raw Speech Features for Domain Invariant Speech Recognition—May 21, 2018—(Year: 2018).*

(Continued)

*Primary Examiner* — Akwasi M Sarpong
(74) *Attorney, Agent, or Firm* — Buckley, Maschoff & Talwalkar LLC

(57) ABSTRACT

To generate substantially domain-invariant and speaker-discriminative features, embodiments are associated with a feature extractor to receive speech frames and extract features from the speech frames based on a first set of parameters of the feature extractor, a senone classifier to identify a senone based on the received features and on a second set of parameters of the senone classifier, an attention network capable of determining a relative importance of features extracted by the feature extractor to domain classification, based on a third set of parameters of the attention network, a domain classifier capable of classifying a domain based on the features and the relative importances, and on a fourth set of parameters of the domain classifier; and a training platform to train the first set of parameters of the feature extractor and the second set of parameters of the senone classifier to minimize the senone classification loss, train the first set of parameters of the feature extractor to maximize the domain classification loss, and train the third set of parameters of the attention network and the fourth set of parameters of the domain classifier to minimize the domain classification loss.

20 Claims, 7 Drawing Sheets

(51) Int. Cl.
- G10L 15/02 (2006.01)
- G10L 17/04 (2013.01)
- G10L 15/16 (2006.01)
- G06N 3/04 (2006.01)

(58) Field of Classification Search
USPC .................. 704/246, 239, 238, 236; 706/20
See application file for complete search history.

(56) References Cited

U.S. PATENT DOCUMENTS

| | | | | |
|---|---|---|---|---|
| 10,872,602 | B2* | 12/2020 | Nosrati | H04R 3/04 |
| 2011/0218803 | A1* | 9/2011 | Ketabdar | G10L 25/69 |
| | | | | 704/240 |
| 2013/0166279 | A1* | 6/2013 | Dines | G10L 15/063 |
| | | | | 704/8 |
| 2016/0042734 | A1* | 2/2016 | Cetinturk | G10L 15/063 |
| | | | | 704/236 |
| 2016/0078339 | A1* | 3/2016 | Li | G09B 5/00 |
| | | | | 706/20 |
| 2017/0178666 | A1* | 6/2017 | Yu | G10L 25/30 |
| 2017/0249547 | A1* | 8/2017 | Shrikumar | G06N 3/0481 |
| 2017/0263237 | A1* | 9/2017 | Green | G10L 15/24 |
| 2018/0039856 | A1* | 2/2018 | Hara | G06N 3/0454 |
| 2019/0243743 | A1* | 8/2019 | Saxena | G06F 11/0766 |
| 2020/0026965 | A1* | 1/2020 | Guo | G06N 3/0454 |
| 2020/0184072 | A1* | 6/2020 | Ikeda | G06F 11/34 |
| 2020/0184278 | A1* | 6/2020 | Zadeh | G06F 16/953 |

OTHER PUBLICATIONS

Bousmalis, et al., "Domain separation networks", In Proceedings of 30th Conference on Neural Information Processing Systems, Dec. 5, 2016, 15 Pages.

Chan, et al., "Listen, attend and spell: A neural network for large vocabulary conversational speech recognition", In EEE International Conference on Acoustics, Speech and Signal Processing (ICASSP), Mar. 20, 2016, pp. 4960-4964, 5 Pages.

Cho, et al., "Learning Phrase Representations using RNN Encoder-Decoder for Statistical Machine Translation", In Proceedings of Conference on Empirical Methods in Natural Language Processing, Jun. 3, 2014, 15 Pages.

Chorowski, et al., "Attention-based models for speech recognition", In the Journal of Advances in neural Information processing systems, 2015, 9 Pages.

Ganin, et al., "Unsupervised Domain Adaptation by Backpropagation", In Proceedings of the 32nd International Conference on Machine Learning, Sep. 26, 2014, 10 Pages.

Goodfellow, et al., "Generative Adversarial Nets", In Proceedings of Advances in Neural Information Processing Systems, Dec. 8, 2014, pp. 1-9, 9 Pages.

Hinton, et al., "Deep Neural Networks for Acoustic Modeling in Speech Recognition", In IEEE Signal Processing Magazine, Nov. 2012, pp. 82-97, 16 Pages.

Jaitly, et al., "Application of Prelrained Deep Neural Networks to Large Vocabulary Speech Recognition", In Proceedings of 13th Annual Conference of the International Speech Communication Association, Sep. 9, 2012, 4 Pages.

Li, et al., "Improving Wideband Speech Recognition Using Mixed-Bandwidth Training Data in Cd-Dnn-Hmm", In the Proceedings of IEEE Spoken Language Technology Workshop, Dec. 2, 2012, 6 Pages.

Luong, et al., "Effective approaches to attention-based neural machine translation", In Journal of the Computing Research Repository, Aug. 17, 2015, 10 Pages.

Marxer, et al., "The third chime speech separation and recognition challenge: Dataset, task and baselines", In Proceedings of IEEE Workshop on Automatic Speech Recognition and Understanding, Dec. 13, 2015, 10 Pages.

Meng, et al., "Adversarial teacher-student learning for unsupervised domain adaptation", In Proceedings of IEEE International Conference on Acoustics, Speech and Signal Processing (ICASSP), Apr. 2, 2018, 5 Pages.

Meng, et al., "Attentive Adversarial Learning for Domain-Invariant Training", In Proceedings of EEE International Conference on Acoustics, Speech and Signal Processing (ICASSP), Apr. 17, 2019, 5 Pages.

Meng, et al., "Speaker-invariant Training via Adversarial Learning", In IEEE International Conference on Acoustics, Speech and Signal Processing (ICASSP), Apr. 15, 2018, 5 Pages.

Povey, et al., "A time-restricted self-attention layer for asr", In IEEE International Conference on Acoustics, Speech and Signal Processing (ICASSP), Apr. 15, 2018, 5 Pages.

Sainath, et al., "Making Deep Belief Networks Effective for Large Vocabulary Continuous Speech Recognition", In Workshop on Automatic Speech Recognition and Understanding (ASRU), Dec. 11, 2011, 6 Pages.

Sak, et al., "Long Short-term Memory Recurrent Neural Network Architectures for Large Scale Acoustic Modeling", In Proceedings of the Fifteenth Annual Conference of the International Speech Communication Association, 2014, 5 Pages.

Saon, et al., "English Conversational Telephone Speech Recognition by Humans and Machines", In Proceedings of arXiv preprint arXiv:1703.02136, Mar. 6, 2017, 7 Pages.

Seide, et al., "Conversational Speech Transcription Using Context-Dependent Deep Neural Networks", in Proc. Interspeech 2011, Aug. 28, 2011, pp. 437-440, 4 Pages.

Serdyuk, et al., "Invariant Representations for Noisy Speech Recognition", In Proceedings of the 30th Conference on Neural Information Processing Systems, Dec. 5, 2016, 5 Pages.

Shinohara, Yusuke, "Adversarial multi-task learning of deep neural networks for robust speech recognition", In Proceedings of International Speech Communication Association, Sep. 8, 2016, pp. 2369-2372, 4 Pages.

Sun, et al., "Domain adversarial training for accented speech recognition", In IEEE International Conference on Acoustics, Speech and Signal Processing (ICASSP), Apr. 15, 2018, pp. 4854-4858, 5 Pages.

Vaswani, et al., "Attention Is All You Need", In Proceedings of the 31st Conference on Neural Information Processing Systems, Jun. 1, 2017, 11 Pages.

Yi, et al., "Adversarial multilingual training for low-resource speech recognition", In IEEE International Conference on Acoustics, Speech and Signal Processing (ICASSP), Apr. 15, 2018, pp. 4899-4903, 5 Pages.

Yu, et al., "Recent progresses in deep learning based acoustic models", In IEEE/CAA Journal of Automatica Sinica, vol. 4, No. 3, Jul. 2017, pp. 399-412, 14 Pages.

Zhang, et al., "Self-attention generative adversarial networks", In Proceedings of arXiv arXiv:1805.08318, May 21, 2018, 10 Pages.

Meng, et al., "Adversarial Speaker Adaptation", In Proceedings of the IEEE International Conference on Acoustics, Speech and Signal Processing, May 12, 2019, pp. 5721-5725.

"International Search Report and Written Opinion Issued in PCT Application No. PCT/US20/020580", dated May 29, 2020, 13 Pages.

Tripathi, et al., "Adversarial Learning of Raw Speech Features for Domain Invariant Speech Recognition", In Repository of arXiv:1805.08615, May 21, 2018, 5 Pages.

* cited by examiner

ATTENTIVE ADVERSARIAL DOMAIN-INVARIANT TRAINING

CROSS-REFERENCE TO RELATED APPLICATIONS

The present application claims the benefit of U.S. Provisional Patent Application No. 62/834,565, filed Apr. 16, 2019, the entire contents of which are incorporated herein by reference for all purposes.

BACKGROUND

Deep neural network (DNN)-based acoustic models are commonly used to perform automatic speech recognition. Generally, such a deep neural network is trained to extract senone-discriminative features from input speech frames and to classify senones based on the input speech frames. However, since these models are trained with speech data from a variety of domains (e.g., physical environments, speakers, microphone channels) and are used to recognize speech from a variety of domains, accuracy of the models is negatively affected by the spectral variations in speech frames resulting from inter-domain variability.

Adversarial domain-invariant training (ADIT) has been used to suppress the effects of domain variability in automatic speech recognition. According to ADIT, an additional DNN domain classifier is jointly trained with a DNN acoustic model to simultaneously minimize the senone classification loss of the DNN acoustic model, minimize the domain classification loss of the domain classifier, and maximize the domain classification loss with respect to the feature extraction layers of the DNN acoustic model. ADIT may therefore train the feature extraction layers of the DNN acoustic model to map input speech frames from different domains into domain-invariant and senone-discriminative deep hidden features, such that senone classification is based on deep hidden features in which domain variability is normalized out.

Improvements in the domain classification used for ADIT are desired. Such improvements may generate deep features with increased domain-invariance without changing the DNN acoustic model.

DETAILED DESCRIPTION

The following description is provided to enable any person in the art to make and use the described embodiments. Various modifications, however, will remain readily apparent to those of ordinary skill in the art.

The above-described mini-maximization of domain classification loss in ADIT assists in normalizing intermediate deep features extracted by a feature extractor against different domains. In ADIT, the domain classification loss is computed from a sequence of equally-weighted deep features. Some embodiments exploit the fact that not all deep features are equally affected by domain variability, nor do all deep features provide identical domain-discriminative information to the domain classifier. For example, deep features extracted from voiced frames are more domain-discriminative than those extracted from silent frames, and deep features aligned with vowels may be more susceptible to domain variability than those aligned with consonants.

Some embodiments introduce an attention mechanism to weight deep features prior to domain classification in order to emphasize the domain normalization of more domain-discriminative deep features and therefore enhance the overall domain-invariance of the feature extractor. An acoustic model utilizing a thusly-trained feature extractor may achieve improved speech recognition performance over an acoustic model utilizing a feature extractor trained according to ADIT.

The attention mechanism allows the domain classifier to attend to different positions in time of a deep feature sequence with nonuniform weights. The weights are automatically and dynamically determined by the attention mechanism according to the importance of the deep features in domain classification. The domain classifier induces attentive reversal gradients that emphasize the domain normalization of more domain-discriminative deep features, improving the domain invariance of the acoustic model and thus the automatic speech recognition performance of the trained DNN acoustic model. The domain classifier and the auxiliary attention block do not participate in automatic speech recognition, so the proposed framework can be widely applied to acoustic models having any DNN architectures.

Figure 1:
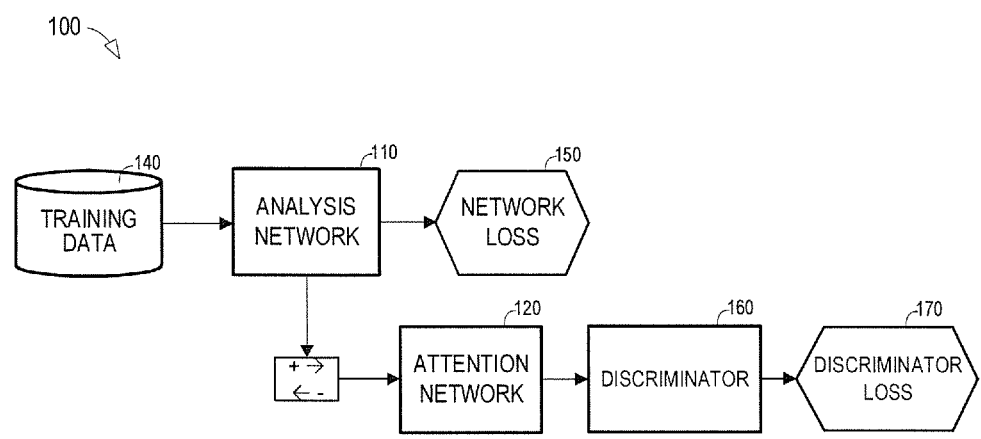
FIG. 1 is a block diagram of a system to train a network using attentive adversarial learning according to some embodiments.

FIG. 1 illustrates system 100 according to some embodiments. System 100 may be used to train analysis network 110 regardless of the task for which analysis network 110 is intended. Such tasks may include but are not limited to speech enhancement, speech synthesis, voice conversion, speaker verification, image generation and translation. In a specific example, attention network 120 may be used as described below to enhance the capability of discriminator 130 in any generative adversarial network or gradient reversal layer network for improved domain and/or speaker adaptation.

During training, analysis network 110 generates outputs based on training data 140. Network loss 150 represents a difference between the outputs and a desired output. Attention network 120 receives the hidden units or output units of the attention network and weights the outputs before providing it to discriminator 160. Discriminator 160 predicts a domain based on a combination of the weighted outputs received from attention network 120. A domain may indicate an environment, a speaker, etc.

The parameters of analysis network 110 are optimized in order to minimize network loss 150. The parameters of attention network 120 and discriminator 160 are optimized to minimize discriminator loss 170. However, a portion of the parameters of analysis network 110 are jointly trained with an adversarial objective, which is to maximize discriminator loss 170. Such optimization is based on an understanding that the ability of discriminator 160 to accurately predict a domain is inversely related to the domain-invariance of the outputs received from analysis network 110.

Figure 2:
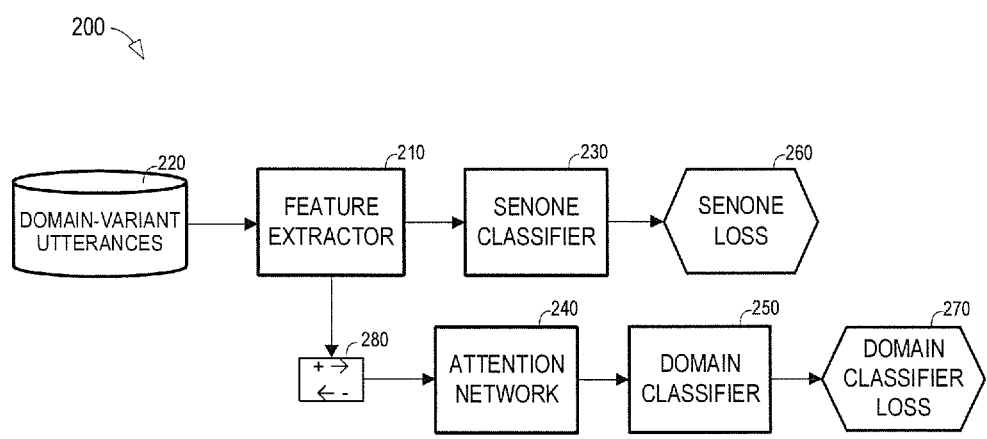
FIG. 2 is a block diagram of a system to train a speech recognition network including a substantially domain-invariant deep feature extractor according to some embodiments.

FIG. 2 illustrates speech recognition-specific system 200, which may comprise a special case of system 100. System 200 may be used to train feature extractor 210 to learn substantially domain-invariant and senone-discriminative features based on domain-variant speech utterances. Senone classifier 230 predicts senone posteriors based on features received from feature extractor 210. Attention network 240 receives features from feature extractor 210 and weights the features before providing them to domain classifier 250. Domain classifier 250 predicts a domain based on the weighted features received from attention network 240.

The following description of system 200 may be applied to implementations of system 100, albeit with respect to the type of temporal data and target posteriors under consideration.

In some embodiments, feature extractor 210 comprises the first few layers of a background deep neural network as a feature extractor network $M_f$ with parameters $\theta_f$ that maps input speech frames $X=\{x_1, \ldots, x_T\}$, $x_T \in R^{r_x}$, $t=1, \ldots, T$ from a training set to intermediate deep hidden features $F=\{f_1, \ldots, f_T\}$, $f_T \in R^{r_f}$ and senone classifier 230 comprises the upper layers $M_y$ of the background deep neural network with parameters $\theta_y$ that maps the deep hidden features F to the senone posteriors $p(s|f_t; \theta_y)$, $s \in S$ as follows:

$$M_y(f_t)=M_y(M_f(x_t))=p(s|x_t;\theta_f,\theta_y)$$

Domain classifier 250 may comprise a domain classifier network $M_d$ which maps the deep features F to the domain posteriors $p(u|x_t; \theta_f, \theta_d)$, $u \in U$ as follows:

$$M_d(M_f(x_t))=p(u|x_t;\theta_f,\theta_d)$$

where u is one domain in the set of all domains U.

Attention network 240 automatically weights the deep features extracted by feature extractor 210 according to their importance in domain classification by domain classifier 250. Such attentive re-weighting emphasizes the domain normalization of phonetic components that are more susceptible to domain variability and generates deep features with improved domain-invariance and senone-discriminativity.

Attention network 240 (or 140) according to some embodiments may employ soft local (time-restricted) self-attention, in view of the relatively large number of speech frames of a typical input sequence in speech recognition, but embodiments are not limited thereto. According to some embodiments, the local attention selectively focuses on a small window of context centered at the current time and can jointly attend to different points in time with different weights. Specifically, for each deep feature $f_t$ at time t, the keys are the projections of deep features in an $r_a$ dimensional space within the attention window of size L+R+1, i.e., $K_T=\{k_{t-L}, \ldots, k_t, \ldots, k_{t+R}\}$, and the query $q_t$ is the projection of $f_t$ in the $r_a$ dimensional space, i.e., $$k_T=W_k f_t$$

$$q_T=W_q f_t,$$

where $W_k$ is a $r_a$ by $r_f$ key projection matrix, $W_q$ is a $r_a$ by $r_f$ query projection matrix and L and R are the length of left context and right context, respectively, in the attention window. The attention probability $a_t$ of each current frame $f_t$ against all the context deep features in the attention window, i.e., $V_T=\{f_{t-L}, \ldots, f_t, \ldots, f_{t+R}\}$, is computed by normalizing the similarity scores $e_{t,\tau} \in R$ between the query $q_t$ and each key $k_\tau$ in the window $K_T$, i.e., $$a_{t,\tau} = \frac{\exp(e_{t,\tau})}{\sum_{\tau'=t-L}^{t+R} \exp(e_{t,\tau'})}$$

where $\tau=t-L, \ldots, t, \ldots, t+R$ and $a_{t,\tau} \in R$ is the $[\tau-(t-L)]^{th}$ dimension of the attention probability vector $a_t \in R^{L+R+1}$. The similarity scores $e_{t,\tau}$ can be computed in two different ways according to the type of attention mechanism applied:

In the case of a dot-product-based attention mechanism:

$$e_{t,\tau} = \frac{k_\tau^T}{\sqrt{r_a}}$$

In the case of an additive attention mechanism:

$$e_{t,\tau} = g^T \tanh k_\tau + q_t + b$$

where $g \in R^{r_a}$ is a column vector, and $b \in R^{r_a}$ is the bias column vector.

Therefore, a context vector $c_t$ is formed at each time t as a weighted sum of the deep features in the attention window $V_T$ with the attention vector $a_t$ serving as the combination weights, i.e., $$c_t = \sum_{\tau=t-L}^{t+R} a_{t,\tau} f_\tau$$

The entire attention process described above may be viewed as a single attention function $M_a(\cdot)$ with parameters $\theta_a\{W_k, W_q, g, b\}$ which takes in a sequence of deep features F as input and outputs a sequence of context vectors $C=\{c_1, \ldots, c_T\}$, $c_t \in R^{r_a}$, i.e., $c_t=M_a(f_t)$.

The defined domain classifier $M_d$ receives the context vector $c_t$ an predicts the frame-level domain posteriors for $u \in U$:

$$p(u \mid x_t; \theta_f, \theta_f, \theta_d) = M_d(c_t) = M_d(M_a(f_t)) = M_d(M_a(M_f(x_t)))$$

In order to address domain-invariance of the deep features F, $M_f$, $M_a$, and $M_d$ are jointly trained with an adversarial objective, in which $\theta_f$ is adjusted to maximize the frame-level domain classification loss $\mathcal{L}_{domain}(\theta_f, \theta_a, \theta_d)$ while $\theta_a$ and $\theta_d$ are adjusted to minimize $\mathcal{L}_{domain}(\theta_f, \theta_a, \theta_d)$ as:

$$\mathcal{L}_{domain}(\theta_f, \theta_a, \theta_d) = -\frac{1}{T}\sum_{t=1}^{T} \log p(d_t \mid x_t; \theta_f, \theta_a, \theta_d) = -\frac{1}{T}\sum_{t=1}^{T}\sum_{u \in U} \mathbb{1}[u = d_t] \log M_d(M_a(M_f(x_t)))$$

Moreover, the acoustic model network consisting of feature extractor 210 and senone classifier 230, domain classifier 250 and attention network 240 are trained to jointly optimize the primary task of senone classification and the secondary task of domain classification with an adversarial objective function as follows:

$$(\hat{\theta}_f, \hat{\theta}_y) = \underset{\theta_y, \theta_f}{\arg\min}\, \mathcal{L}_{senone}(\theta_f, \theta_y) - \lambda \mathcal{L}_{domain}(\theta_f, \theta_a, \theta_d)$$

$$(\hat{\theta}_a, \hat{\theta}_d) = \underset{\theta_a, \theta_d}{\arg\min}\, \mathcal{L}_{domain}(\theta_f, \theta_a, \theta_d)$$

where $\lambda$ controls the trade-off between the senone classification loss $\mathcal{L}_{senone}$ and the domain classifier loss $\mathcal{L}_{domain}$, and $\hat{\theta}_f$, $\hat{\theta}_y$, $\hat{\theta}_a$, and $\hat{\theta}_d$ are the optimized network parameters.

These parameters may be updated during training via back propagation with stochastic gradient descent as follows:

$$\theta_f \leftarrow \theta_f - \mu \left[ \frac{\partial \mathcal{L}_{senone}}{\partial \theta_f} - \lambda \frac{\partial \mathcal{L}_{domain}}{\partial \theta_f} \right]$$

$$\theta_a \leftarrow \theta_a - \mu \frac{\partial \mathcal{L}_{domain}}{\partial \theta_a}$$

$$\theta_d \leftarrow \theta_d - \mu \frac{\partial \mathcal{L}_{domain}}{\partial \theta_d}$$

$$\theta_y \leftarrow \theta_y - \mu \frac{\partial \mathcal{L}_{senone}}{\partial \theta_y}$$

where $\mu$ is the learning rate. The negative coefficient $-\lambda$ induces a reversed gradient that maximizes $\mathcal{L}_{domain}(\theta_f, \theta_c)$ to result in domain-invariant deep features. Gradient reversal layer 280 may provide an identity transform in the forward propagation and multiply the gradient by $-\lambda$ during the backward propagation.

The optimized DNN acoustic model consisting of $M_f$ (e.g., feature extractor 210 and $M_y$ (e.g., senone classifier 220) are used for automatic speech recognition, while attention network 240 (i.e., $M_a$) and domain classifier 250 (i.e., $M_d$) are discarded after parameter training.

According to some embodiments, the keys, queries and values are further extended with a one-hot encoding of the relative positions versus the current time in an attention window, and the attention vectors are computed based on the extended representations. Some embodiments also introduce multi-head attention by projecting the deep features H times to get H keys and queries in H different spaces. The dimension of projection space for each attention head is one Hth of that in single-head attention to keep the number of parameters unchanged.

Figure 3:
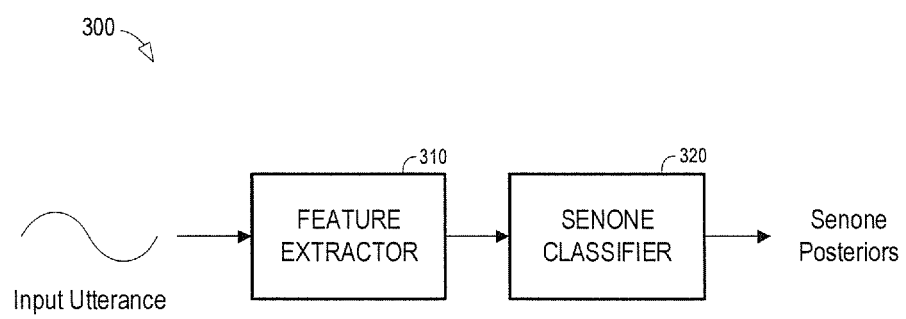
FIG. 3 is a block diagram of a system to recognize speech using a feature extractor trained in accordance with some embodiments.

As described above, a thusly-trained DNN acoustic model consisting of $M_f$ and $M_y$ may be used for automatic speech recognition. FIG. 3 shows system 300 includes feature extractor 310 ($M_f$) and senone classifier 320 ($M_y$) trained according to some embodiments.

Feature extractor 310 receives input utterance and operates as trained to generate substantially domain-invariant and senone-discriminative frame-level deep hidden features. Senone classifier 320 receives the features and also operates according to its trained parameters to produce posterior features for each frame f, which provide statistical likelihoods that the frame f is generated by various senones. The posteriors may be used in various embodiments to identify words represented by the utterance, for example, to determine whether a key phrase is present, to identify the content of a command or query, to perform transcription, etc.

Figure 4:
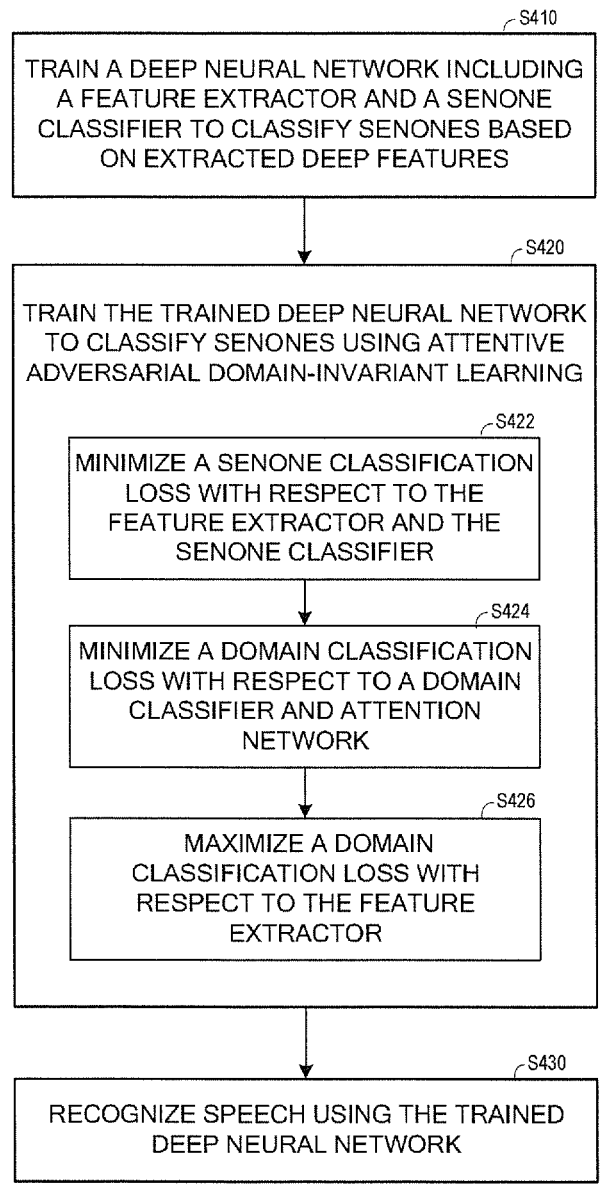
FIG. 4 is a flow diagram of a process to train and use a speech recognition network according to some embodiments.

FIG. 4 is a flow diagram of a process to train a DNN acoustic model to generate substantially domain-invariant and senone-discriminative features according to some embodiments. The FIG. 4 process and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

Figure 5:
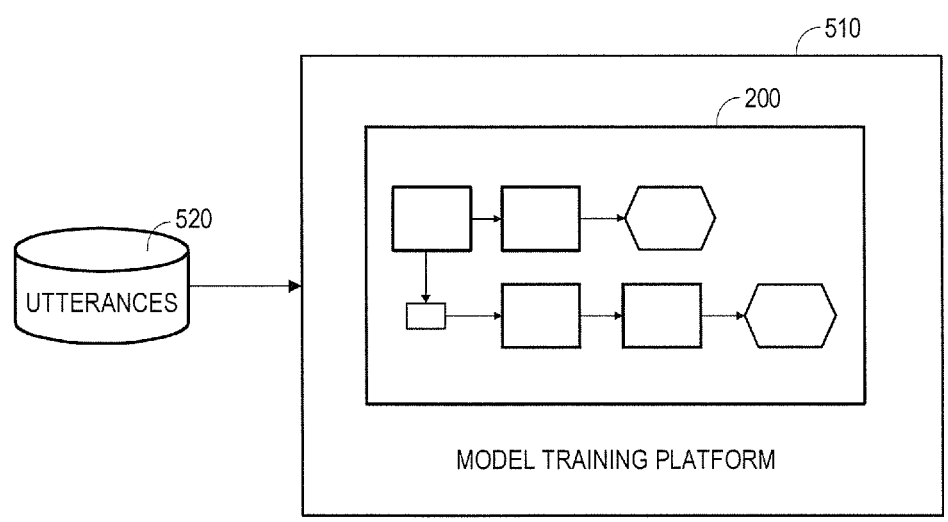
FIG. 5 is a block diagram to illustrate training of a substantially domain-invariant deep feature extractor according to some embodiments.

Initially, at S410, a DNN including a feature extractor and a senone classifier is trained to classify senones based on extracted deep features. FIG. 5 illustrates training of a system according to some embodiments. Model training platform 510 may comprise any suitable system to instantiate and train one or more artificial neural networks of any type. In the present example, model training platform 510 implements system 200 of FIG. 2 including a DNN consisting of feature extractor 210 and senone classifier 230, a DNN consisting of attention network 240 and a DNN consisting of domain classifier 250.

Generally, model training platform 510 operates to input training data to system 200, evaluate the resulting output of system 200 (e.g., the senone and domain classification losses) with respect to training objectives (e.g., minimize senone classification loss and mini-maximize domain classification loss, modify parameters of system 200 accordingly, and repeat the process until the training objectives are sufficiently met.

According to some embodiments, the training data is determined based on speech signals stored in datastore 520. Datastore 520 associates each of a plurality of pre-captured utterances with senones (e.g., in text format) represented by the utterance. The utterances may comprise sentences recorded in different noise environments (e.g., café, street junction, bus), including a clean (i.e., low or no noise) environment.

In one non-exhaustive example of S410, the feature extractor and senone classifier are implemented as a long short-term memory (LSTM) hidden Markov model (HMM) acoustic model. A neural network (e.g., deep learning, deep convolutional, or recurrent) according to some embodiments comprises a series of "neurons," such as LSTM nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. Neurons and neural networks may be constructed programmatically (e.g., via software instructions) or via specialized hardware linking each neuron to form the neural network.

The DNN may be trained with 9137 clean and 9137 noisy training utterances using a cross-entropy criterion. Initially, 29-dimensional log Mel filterbank features together with 1st and 2nd order delta features (87-dimensions in total) for both the clean and noisy utterances are extracted. These features are fed as the input to the LSTM after global mean and variance normalization. The LSTM includes 4 hidden layers and 1024 hidden units within each layer. A 512-dimensional projection layer is inserted on top of each hidden layer to reduce the number of parameters. The output layer of the LSTM includes 3012 output units corresponding to 3012 senone labels. There is no frame stacking, and the output HMM senone label is delayed by 5 frames. Senone-level forced alignment of the clean data is generated using a Gaussian mixture model-HMM system.

Adversarial domain-invariant training of the trained baseline background DNN is then performed at S410 using 9137 noisy utterances of the training set. The feature extractor network ($M_f$) is initialized with the first P layers of the trained LSTM and the senone classifier ($M_y$) is initialized with the remaining (e.g., 7-P) trained layers and the trained output layer. P indicates the position of the deep hidden features in the acoustic model. Training may then be conducted to address the effect of domain variability. The domain classification network ($M_d$) is a feed-forward deep neural network with 3 hidden layers and 512 hidden units for each layer. The output layer of ($M_d$) has 5 units predicting the posteriors of 4 noisy environments and 1 clean environment in the training set.

$M_f$ and $M_d$ are then jointly trained with an adversarial multi-task objective, in which $\theta_f$ is adjusted to maximize the frame-level domain classification loss $\mathcal{L}_{domain}(\theta_f, \theta_d)$ while $\theta_d$ is adjusted to minimize $\mathcal{L}_{domain}(\theta_f, \theta_d)$:

$$\mathcal{L}_{domain}(\theta_f, \theta_d) = -\frac{1}{T}\sum_{t=1}^{T} \log p(d_t \mid f_t; \theta_d) = -\frac{1}{T}\sum_{t=1}^{T}\sum_{u \in U} 1[u = d_t] \log M_d(M_f(x_t))$$

At the same time, F is made senone-discriminative by minimizing the cross-entropy senone classification loss between the predicted senone posteriors and the senone labels as below:

$$\mathcal{L}_{senone}(\theta_f, \theta_{dy}) = -\frac{1}{T}\sum_{t=1}^{T} \log p(y_t \mid x_t; \theta_f; \theta_y) = -\frac{1}{T}\sum_{t=1}^{T}\sum_{u \in U} 1[s = y_t] \log M_y(M_f(x_t))$$

Moreover, the acoustic model network (e.g., feature extractor 210 and senone classifier 230) and the domain classifier 250 are trained to jointly optimize the primary task of senone classification and the secondary task of domain classification with an adversarial objective function as follows:

$$\mathcal{L}_{senone}(\hat{\theta}_f, \hat{\theta}_y) = \arg\min_{\theta_y, \theta_f} \mathcal{L}_{senone}(\theta_f, \theta_y) - \lambda \mathcal{L}_{domain}(\theta_f, \hat{\theta}_d)$$

$$(\hat{\theta}_d) = \arg\min_{\theta_d} \mathcal{L}_{domain}(\hat{\theta}_f, \theta_d)$$

where $\lambda$ controls the trade-off between the senone classification loss $\mathcal{L}_{senone}$ and the domain classifier loss $\mathcal{L}_{domain}$, and $\hat{\theta}_f$, $\hat{\theta}_y$, and $\hat{\theta}_d$ are the optimized network parameters. According to some embodiments, $\lambda$ is 0.5 and P is 4.

Next, at S420, attention network 240 is inserted as shown in FIG. 2 and the trained DNN acoustic model (e.g., feature extractor 210 and senone classifier 230), the trained domain classifier 250 and attention network 240 are further trained to minimize a senone classification loss with respect to the feature extractor and the senone classifier (S422), to minimize a domain classification loss with respect to the domain classifier and the attention network (S424) and to maximize a domain classification loss with respect to the feature extractor (S426) as described above.

The thusly-trained acoustic model $M_f$ and $M_s$ may then be used at S430 for speech recognition. The trained acoustic model can be used as a component of an automatic speech recognition unit in any number of different types of devices and systems. For example, automatic speech recognition using the trained acoustic model can be implemented in digital assistants, chatbots, voice control applications, and other related devices and systems including in associated voice services such as software development kit (SDK) offerings. Automatic speech recognition services using the trained acoustic model can be implemented in cloud architectures. A chatbot is a program that can conduct conversations via auditory or textual methods. A bot is a program that can access web sites and gather content based on a provided search index. The web sites can be coupled to the Internet, an intranet, or the web sites may be databases, each database accessible by its own addresses according to a protocol for the respective database.

Figure 6:
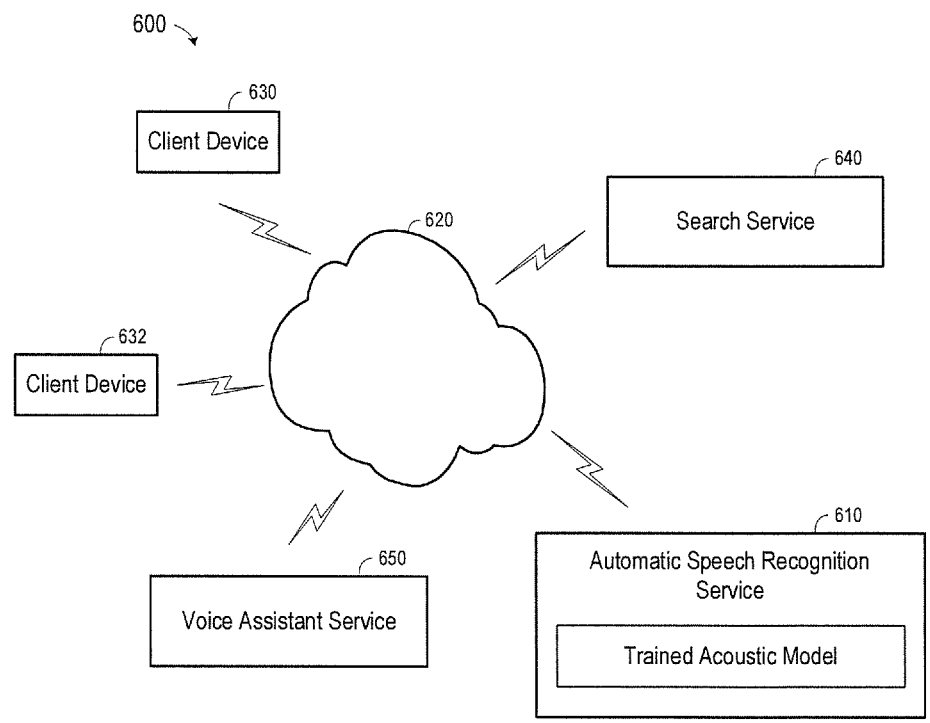
FIG. 6 is a block diagram of a cloud computing system providing voice recognition services according to some embodiments.

FIG. 6 illustrates distributed transcription system 600 according to some embodiments. System 600 may be cloud-based and components thereof may be implemented using on-demand virtual machines, virtual servers and cloud storage instances. Such cloud-based components may be connected to the Internet and/or to any network or combinations of networks. A cloud can include a wide area network (WAN) like the public Internet or a private, national or global network, and may include a local area network (LAN) within an organization providing the services of the data center. In addition, the term "cloud computing" refers to the software and services executed for users by these servers, with a user typically being unaware of the physical location of the servers or data centers. Further, the data center may be a distributed entity.

As shown, automatic speech recognition service 610 may be implemented as a cloud service providing transcription of speech audio signals received over cloud 620. Automatic speech recognition service 610 may include an acoustic model trained using attentive adversarial domain-invariant training for domain-invariance and senone-discriminativity as described above.

Each of client devices 630 and 632 may be operated to request services such as search service 640 and voice assistant service 650. Services 640 and 650 may, in turn, request automatic speech recognition functionality from automatic speech recognition service 610.

Figure 7:
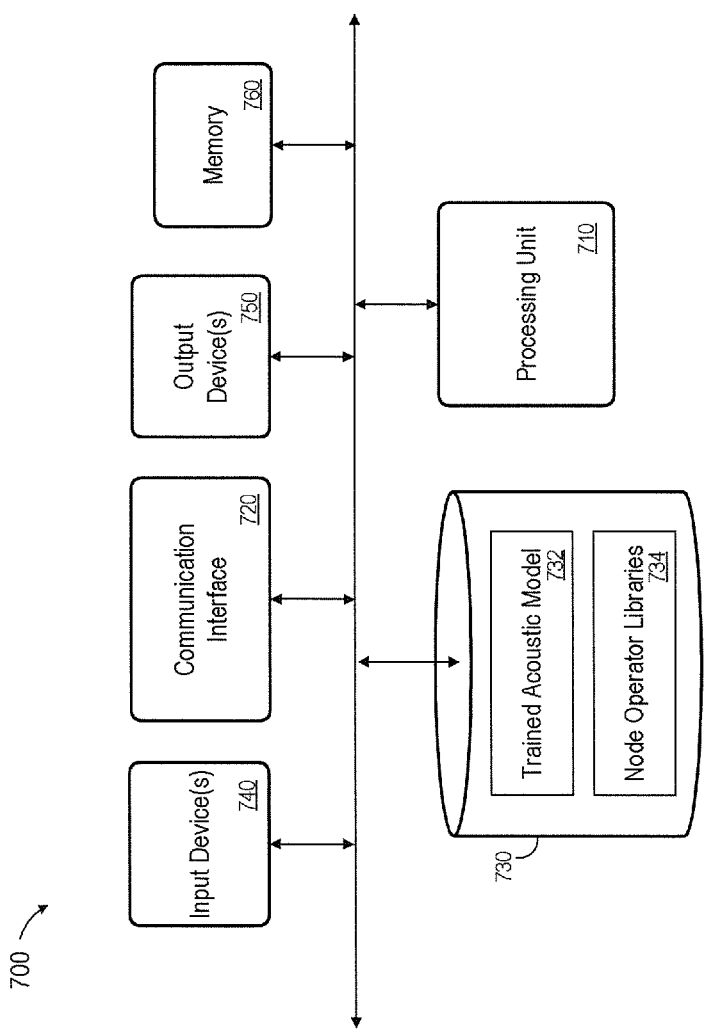
FIG. 7 is a block diagram of a system to provide automatic speech recognition according to some embodiments.

FIG. 7 is a block diagram of system 700 according to some embodiments. System 700 may comprise a general-purpose server computer and may execute program code to provide an automatic speech recognition service as described herein. System 700 may be implemented by a cloud-based virtual server according to some embodiments.

System 700 includes processing unit 710 operatively coupled to communication device 720, persistent data storage system 730, one or more input devices 740, one or more output devices 750 and volatile memory 760. Processing unit 710 may comprise one or more processors, processing cores, etc. for executing program code. Communication interface 720 may facilitate communication with external devices, such as client devices, and data providers as described herein. Input device(s) 740 may comprise, for example, a keyboard, a keypad, a mouse or other pointing device, a microphone, a touch screen, and/or an eye-tracking device. Output device(s) 750 may comprise, for example, a display (e.g., a display screen), a speaker, and/or a printer.

Data storage system 730 may comprise any number of appropriate persistent storage devices, including combinations of magnetic storage devices (e.g., magnetic tape, hard disk drives and flash memory), optical storage devices, Read Only Memory (ROM) devices, etc. Memory 760 may comprise Random Access Memory (RAM), Storage Class Memory (SCM) or any other fast-access memory.

Trained acoustic model 732 may comprise program code executed by processing unit 710 to cause system 700 to recognize senones based on input speech signals using substantially domain-invariant and senone-discriminative deep features as described herein. Node operator libraries 734 may comprise program code to execute functions of a neural network nodes based on trained parameter values as described herein. Data storage device 730 may also store data and other program code for providing additional functionality and/or which are necessary for operation of system 700, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a processing unit; and
   a memory storage device including program code that when executed by the processing unit causes to the system to:
   receive speech frames and extract features from the speech frames based on a first set of parameters;
   identify senones based on the extracted features and on a second set of parameters;
   determine a relative importance of each of the extracted features to domain classification, based on a third set of parameters;
   classify a domain based on the extracted features, the relative importances, and a fourth set of parameters;
   determine a senone classification loss associated with the second set of parameters;
   determine a domain classification loss associated with the fourth set of parameters;
   train the first set of parameters and the second set of parameters to minimize the senone classification loss;
   train the first set of parameters to maximize the domain classification loss; and
   train the third set of parameters and the fourth set of parameters to minimize the domain classification loss.

2. The system of claim 1, wherein training of the first set of parameters and the second set of parameters to minimize the senone classification loss, training of the first set of parameters to maximize the domain classification loss, and training of the third set of parameters and the fourth set of parameters of the domain classifier occur substantially simultaneously.

3. The system of claim 1, wherein classification of a domain comprises determination of a posterior associated with each of a plurality of noise environments, and
   wherein identification of a senone comprises determination of a posterior associated with each of a plurality of senones.

4. The system of claim 1, wherein determination of the relative importances comprises generation of a context vector for each time t as a weighted sum of the features associated with an attention time window including time t.

5. The system of claim 1, wherein determination of a relative importance of each of the extracted features to domain classification comprises determination of an attention probability of each current feature against features in an attention window by normalizing similarity scores between each query and each key in a window.

6. The system of claim 5, wherein each key and query conform to a first dimensional space, and the similarity scores are determined based on a number of dimensions of the first dimensional space.

7. The system of claim 5, wherein each key and query conform to a first dimensional space, and the similarity scores are determined based on projections of the extracted features in the first dimensional space.

8. A computer-implemented method comprising:
receiving speech frames;
extracting features from the speech frames based on a first set of parameters;
identifying a senone based on the extracted features and on a second set of parameters;
determining a relative importance of each of the extracted features to domain classification, based on a third set of parameters;
classifying a domain based on the extracted features, the relative importances, and a fourth set of parameters;
determining a senone classification loss associated with the second set of parameters;
determining a domain classification loss associated with the fourth set of parameters;
training the first set of parameters and the second set of parameters to minimize the senone classification loss;
training the first set of parameters to maximize the domain classification loss; and
training the third set of parameters and the fourth set of parameters to minimize the domain classification loss.

9. The method of claim 8, wherein training of the first set of parameters and the second set of parameters to minimize the senone classification loss, training of the first set of parameters to maximize the domain classification loss, and training of the third set of parameters and the fourth set of parameters occur substantially simultaneously.

10. The method of claim 8, wherein classifying a domain comprises determining a posterior associated with each of a plurality of noise environments, and
wherein identifying a senone comprises determining a posterior associated with each of a plurality of senones.

11. The method of claim 8, wherein determining the relative importances comprises generating a context vector for each time t as a weighted sum of the features associated with an attention time window including time t.

12. The method of claim 8, wherein determination of a relative importance of each of the extracted features to domain classification comprises determination of an attention probability of each current feature against features in an attention window by normalizing similarity scores between each query and each key in a window.

13. The method of claim 12, wherein each key and query conform to a first dimensional space, and the similarity scores are determined based on a number of dimensions of the first dimensional space.

14. The method of claim 12, wherein each key and query conform to a first dimensional space, and the similarity scores are determined based on projections of the extracted features in the first dimensional space.

15. A system comprising:
a processing unit; and
a memory storage device including program code that when executed by the processing unit causes to the system to:
extract features from input data based on a first set of parameters;
generate outputs based on the extracted features and on a second set of parameters;
determine a relative importance of each of the extracted features to discrimination, based on a third set of parameters;
perform a discrimination based on the extracted features, the relative importances, and a fourth set of parameters; and
a training platform to:
determine a network loss associated with the second set of parameters;
determine a discrimination loss associated with the fourth set of parameters;
train the second set of parameters to minimize the network loss;
train the second set of parameters to maximize the discrimination loss; and
train the third set of parameters and the fourth set of parameters to minimize the discrimination loss.

16. The medium of claim 15, wherein training of the second set of parameters to minimize the network loss, training of the second set of parameters to maximize the discrimination loss, and training of the third set of parameters and the fourth set of parameters to minimize the discrimination loss occur substantially simultaneously.

17. The medium of claim 15, wherein determination of the relative importances comprises generation of a context vector for each time t as a weighted sum of the features associated with an attention time window including time t.

18. The medium of claim 15, wherein determination of a relative importance of each of the extracted features to discrimination comprises determination of an attention probability of each current feature against features in an attention window by normalizing similarity scores between each query and each key in a window.

19. The medium of claim 18, wherein each key and query conform to a first dimensional space, and the similarity scores are determined based on a number of dimensions of the first dimensional space.

20. The medium of claim 18, wherein each key and query conform to a first dimensional space, and the similarity scores are determined based on projections of the extracted features in the first dimensional space.

* * * * *